(12) United States Patent
White et al.

(10) Patent No.: US 10,200,726 B2
(45) Date of Patent: *Feb. 5, 2019

(54) SYSTEM FOR EXCHANGING MEDIA CONTENT BETWEEN A MEDIA CONTENT PROCESSOR AND A COMMUNICATION DEVICE

(71) Applicant: AT&T INTELLECTUAL PROPERTY I, L.P., Atlanta, GA (US)

(72) Inventors: Scott White, Austin, TX (US); James Cansler, Pflugerville, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/253,094

(22) Filed: Aug. 31, 2016

(65) Prior Publication Data

US 2016/0373791 A1 Dec. 22, 2016

Related U.S. Application Data

(60) Continuation of application No. 14/223,356, filed on Mar. 24, 2014, now Pat. No. 9,462,310, which is a
(Continued)

(51) Int. Cl.
*H04N 21/4147* (2011.01)
*H04N 21/431* (2011.01)
(Continued)

(52) U.S. Cl.
CPC ..... *H04N 21/236* (2013.01); *G06F 17/30017* (2013.01); *G06Q 30/0258* (2013.01);
(Continued)

(58) Field of Classification Search
CPC ............ H04N 21/236; H04N 21/4126; H04N 21/41407; H04N 21/4147; H04N 21/4316;
(Continued)

(56) References Cited

U.S. PATENT DOCUMENTS 6,774,926 B1 * 8/2004 Ellis ................... H04N 5/44543
348/14.01
7,243,123 B1 * 7/2007 Allen ..................... H04N 7/147
709/204
(Continued)

FOREIGN PATENT DOCUMENTS

WO 03051024 6/2003
WO 03077550 9/2003
(Continued)

*Primary Examiner* — Pinkal R Chokshi
(74) *Attorney, Agent, or Firm* — Gantin & Gust, PLC; Jay Anderson

(57) ABSTRACT

A system that incorporates teachings of the present disclosure may include, for example, a media content processor having a controller adapted to detect an event associated with recorded media content derived from one among a plurality of media content sources, select a communication device of a subscriber of the media content processor, retrieve a portion of the recorded media content, generate a notice describing the event, and transmit the notice with the portion of the recorded media content to the communication device. Other embodiments are disclosed.

20 Claims, 5 Drawing Sheets

Related U.S. Application Data division of application No. 11/851,564, filed on Sep. 7, 2007, now Pat. No. 8,719,892.

(51) Int. Cl.

| | | |
|---|---|---|
| *H04N 21/433* | (2011.01) | |
| *H04N 21/236* | (2011.01) | |
| *H04N 21/41* | (2011.01) | |
| *H04N 21/414* | (2011.01) | |
| *G06F 17/30* | (2006.01) | |
| *G06Q 30/02* | (2012.01) | |
| *G06Q 30/06* | (2012.01) | |
| *H04N 7/16* | (2011.01) | |
| *H04N 21/462* | (2011.01) | |
| *H04N 21/488* | (2011.01) | |
| *H04N 21/643* | (2011.01) | |
| *H04L 29/06* | (2006.01) | |
| *H04N 21/4788* | (2011.01) | |
| *H04L 12/58* | (2006.01) | |

(52) U.S. Cl.
CPC ............ *G06Q 30/06* (2013.01); *H04L 65/601* (2013.01); *H04N 7/163* (2013.01); *H04N 21/4126* (2013.01); *H04N 21/4147* (2013.01); *H04N 21/41407* (2013.01); *H04N 21/433* (2013.01); *H04N 21/4316* (2013.01); *H04N 21/4333* (2013.01); *H04N 21/4334* (2013.01); *H04N 21/4622* (2013.01); *H04N 21/4788* (2013.01); *H04N 21/4882* (2013.01); *H04N 21/64322* (2013.01); *H04L 51/10* (2013.01)

(58) Field of Classification Search
CPC ............. H04N 21/433; H04N 21/4333; H04N 21/4334; H04N 21/4622; H04N 21/4788; H04N 21/4882; H04N 21/64322; H04N 7/163; G06F 17/30017; G06Q 30/0258; G06Q 30/06; H04L 65/601; H04L 51/10
See application file for complete search history.

(56) References Cited

U.S. PATENT DOCUMENTS

| | | | |
|---|---|---|---|
| 7,661,117 B2 | 2/2010 | Markel | |
| 7,826,857 B2 * | 11/2010 | Kiviranta | H04W 64/00 455/456.1 |
| 7,908,211 B1 | 3/2011 | Chen et al. | |
| 2002/0120681 A1 | 8/2002 | Cho et al. | |
| 2002/0174430 A1 | 11/2002 | Ellis | |
| 2003/0041333 A1 | 2/2003 | Allen | |
| 2003/0097659 A1 | 5/2003 | Goldman | |
| 2003/0226143 A1 | 12/2003 | Michael et al. | |
| 2004/0104806 A1 * | 6/2004 | Yui | G08C 17/02 340/5.74 |
| 2004/0205816 A1 * | 10/2004 | Barrett | H04N 5/76 725/49 |
| 2005/0091690 A1 | 4/2005 | Delpuch | |
| 2005/0108348 A1 | 5/2005 | Lee | |
| 2006/0040610 A1 | 2/2006 | Kangas | |
| 2006/0078278 A1 * | 4/2006 | Tajima | H04N 7/163 386/213 |
| 2006/0143651 A1 * | 6/2006 | Kim | H04N 5/445 725/39 |
| 2007/0036086 A1 | 2/2007 | Walter et al. | |
| 2007/0042769 A1 | 2/2007 | Thommana | |
| 2007/0067801 A1 * | 3/2007 | Monta | H04N 5/782 725/44 |
| 2007/0101190 A1 * | 5/2007 | Chen | H04L 12/1827 714/12 |
| 2007/0156521 A1 * | 7/2007 | Yates | G06Q 10/101 705/300 |
| 2007/0213004 A1 | 9/2007 | DaCosta | |
| 2008/0040332 A1 * | 2/2008 | Lee | H04H 60/66 |
| 2008/0147803 A1 * | 6/2008 | Krzyzanowski | H04L 51/043 709/206 |
| 2008/0276272 A1 | 11/2008 | Rajaraman | |
| 2008/0281977 A1 * | 11/2008 | Branam | H04N 7/17318 709/231 |
| 2009/0069038 A1 * | 3/2009 | Olague | H04N 21/235 455/466 |
| 2010/0220972 A1 | 9/2010 | Bryan | |
| 2012/0072960 A1 | 3/2012 | Rosenberg et al. | |

FOREIGN PATENT DOCUMENTS

| | | |
|---|---|---|
| WO | 2005074281 | 8/2005 |
| WO | 20052950300 | 10/2005 |

* cited by examiner

100

400

SYSTEM FOR EXCHANGING MEDIA CONTENT BETWEEN A MEDIA CONTENT PROCESSOR AND A COMMUNICATION DEVICE

CROSS-REFERENCE TO RELATED APPLICATIONS

This application is a continuation of Ser. No. 14/223,356, filed Mar. 24, 2014, which is a division of U.S. patent application Ser. No. 11/851,564 filed Sep. 7, 2007 by White et al., entitled "System for Exchanging Media Content Between a Media Content Processor and a Communication Device" (now U.S. Pat. No. 8,719,892). All sections of the aforementioned applications are incorporated herein by reference in their entireties.

FIELD OF THE DISCLOSURE

The present disclosure relates generally to media content exchange techniques and more specifically to a system for exchanging media content between a media content processor and a communication device.

BACKGROUND

Media content processors such as Set-Top Box (STB) receivers have evolved in sophistication thereby offering subscribers a number of services such as high definition TV decoding, media content recording with a Digital Video Recorder (DVR) service managed thereby, storage of subscriber content (music, home videos, pictures), downloading of media content from on-demand catalogs, and so on. Such devices also have an increased memory capacity for storing large volumes of personal and commercial media content. Making this stored content available to a multiplicity of other devices, and expanding the media content processor's ability to receive media content from a broader source of devices can be cumbersome.

DETAILED DESCRIPTION

In one embodiment of the present disclosure, a computer-readable storage medium operating in a media content processor can have computer instructions for presenting at a media device images associated with a media program decoded from a media content source, receiving from a communication device a request to establish communications with the media content processor, establishing communications with the communication device responsive to the request, receiving from the communication device streamed media content, presenting at the media device a Graphical User Interface (GUI) superimposed on the images associated with the decoded media program, and presenting the streamed media content in the GUI.

In one embodiment of the present disclosure, a media content processor can have a controller adapted to detect an event associated with recorded media content derived from one among a plurality of media content sources, select a communication device of a subscriber of the media content processor, retrieve a portion of the recorded media content, generate a notice describing the event, and transmit the notice with the portion of the recorded media content to the communication device.

In one embodiment of the present disclosure, a portable communication device can have a controller adapted to record media content from a sensor, establish communications with a media content processor, and transmit to the media content processor the recorded media content as streamed media content which the media content processor presents at a media device.

Figure 1:
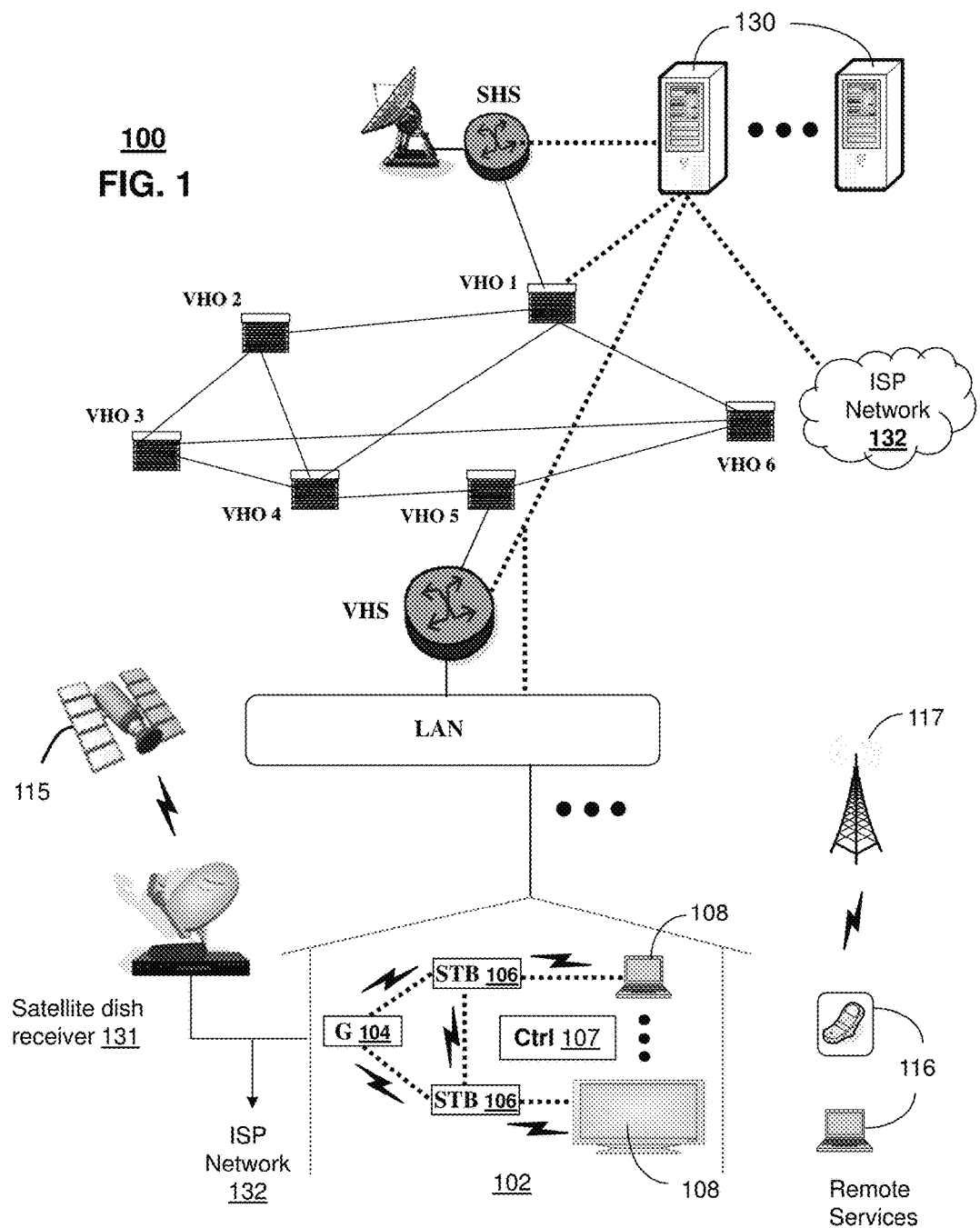
FIG. 1 depicts an exemplary embodiment of a communication system.

FIG. 1 depicts an exemplary embodiment of a communication system 100. The communication system 100 can represent an IPTV broadcast media system. In a typical IPTV infrastructure, there is at least one super head office server (SHS) which receives national media programs from satellite and/or media servers from service providers of multimedia broadcast channels. In the present context, media programs can represent audio only content, video only content, and combinations thereof. The SHS server forwards IP packets associated with the media content to video head servers (VHS) via a network of video head offices (VHO) according to a common multicast communication method.

The VHS then distributes multimedia broadcast programs to commercial and/or residential buildings 102 housing a gateway 104 (e.g., a residential gateway or RG). The gateway 104 distributes broadcast signals to media content processors 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media content processors 106 and subsystems of the IPTV media system for services such as video-on-demand (VoD).

The IPTV media system can be coupled to one or more computing devices 130 that can operate as a web or Internet server for providing portal services over an Internet Service Provider (ISP) network 132 to fixed media devices 108 or portable communication devices 116 by way of a wireless base station 117 such as in a cellular communication network operating with common protocols (GSM, CDMA, UMTS, software defined radio, WiMAX, etc.).

The computing devices 130 can also include a common presence system for monitoring activities and whereabouts of subscribers of the communication system 100. The presence system can for example detect that the subscriber is in transit with a portable communication device 116 by detecting a handover transition between base stations 117 and/or by receiving location coordinates from the portable communication device using a Global Positioning System (GPS) receiver incorporated therein. The presence system can also detect that the subscriber is utilizing a communication device 108 in building 102 based on network activity emanating from said communication device or consumed thereby.

A satellite broadcast system can be used in place of the IPTV media system. In this embodiment, signals transmitted by a satellite 115 can be intercepted by a satellite dish receiver 131 coupled to building 102 which conveys satellite media signals to the media content processors 106 by way of gateway 104. Alternatively, the satellite signals can be received and processed by the media content processor 106 over a satellite port of the media content processor coupled to the satellite dish receiver 131. The media content processors 106 can also be equipped with a broadband port that couples to the ISP network 132 for general broadband access.

Although not shown, the communication system 100 can also be combined or replaced with analog or digital broadcast distributions systems such as cable TV systems. It would be apparent therefore to one of ordinary skill in the art that the present disclosure can be applied to any media content system.

Figure 2:
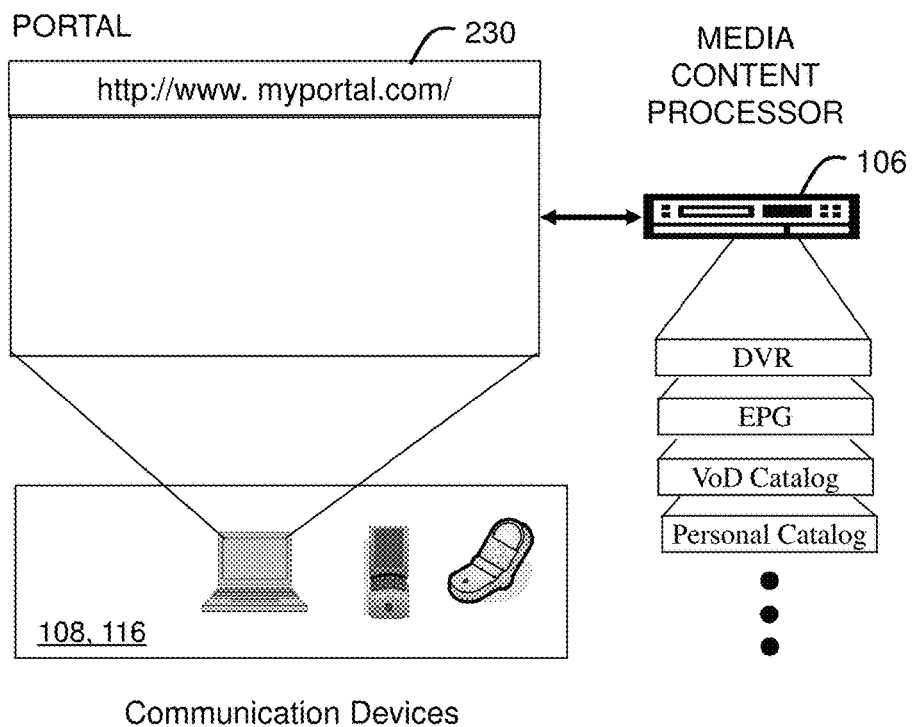
FIG. 2 depicts an exemplary embodiment of a portal of the communication system.

FIG. 2 depicts an exemplary embodiment of a portal 230 of the communication system 100. In FIG. 2, the portal 230 can be accessed by a URL with a common browser such as Microsoft's Internet Explorer using an Internet-capable fixed or portable communication device 108, 116. The portal 230 can be configured to access a media content processor 106 such as the STB of FIG. 1 and services managed thereby such as a Digital Video Recorder (DVR), an Electronic Programming Guide (EPG), Video on Demand (VoD) catalog, a personal catalog stored in the STB (e.g., personal videos, pictures, audio recordings, etc.), and so on by way of the gateway 104. The portal 230 can direct the media content processor 106 to stream media content to a fixed or portable communication device 108, 116 accessing the portal.

Figure 3:
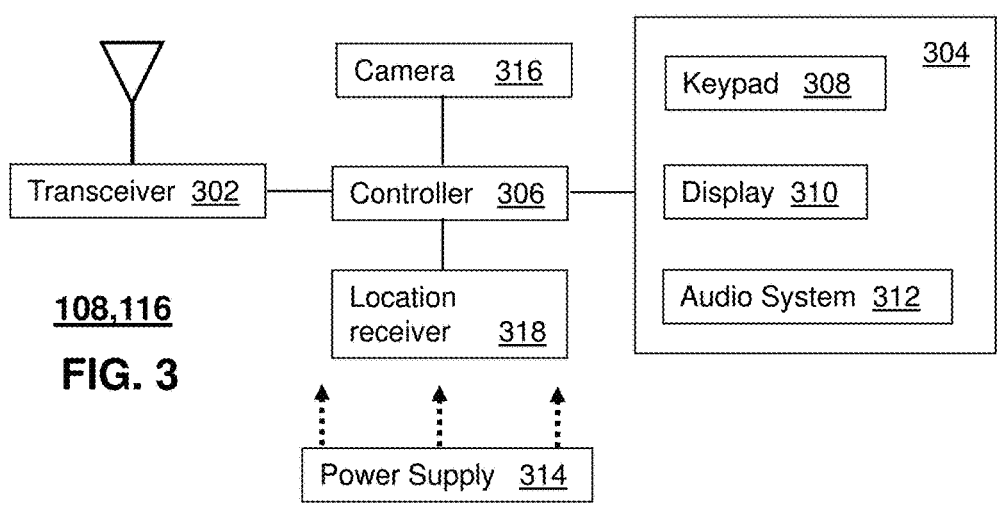
FIG. 3 depicts an exemplary block diagram of a communication of the communication system.

FIG. 3 depicts an exemplary embodiment of the communication device 108 or 116 of the communication system 100. The communication device 108,116 can comprise a wireless transceiver 302, a user interface (UI) 304, a power supply 314, a camera sensor 316, a location receiver 318, and a controller 306 for managing operations thereof. The wireless transceiver 302 utilizes common communication technology supporting common wireless access technologies (i.e., cellular, software defined radio, WiMAX, Bluetooth, WiFi, and so on). The UI 304 can include a depressible or touch sensitive keypad 308 for manipulating operations of the communication device 108, 116. The UI 304 can further include a display 310 such as monochrome or color LCD (Liquid Crystal Display) for conveying images to the end user of the communication device 108, 116.

The audio system 312 of the UI 304 utilizes common audio technology for conveying and receiving audible signals of an end user and of the surrounding environment. Audio recordings can be stored as media content in common formats (e.g., MPEG3). The camera 316 utilizing common image sensing technology (such as a charge coupled device sensor) can be utilized for recording still and moving images (with or without audio) in common formats (MPEG4, JPEG, GIF, etc.). The location receiver 318 can utilize common location sensing technology such as a Global Positioning System (GPS) receiver for determining a location fix of the communication device 108, 116 using signals from a constellation of GPS satellites.

The power supply 314 can utilize common power management technologies (such as replaceable batteries, supply regulation technologies, and charging system technologies) for supplying energy to the components of the portable communication device 116 to facilitate portable applications. The controller 306 can utilize computing technologies such as a microprocessor and/or digital signal processor (DSP) with associated storage memory such a Flash, ROM, RAM, SRAM, DRAM or other like technologies.

Figure 4:
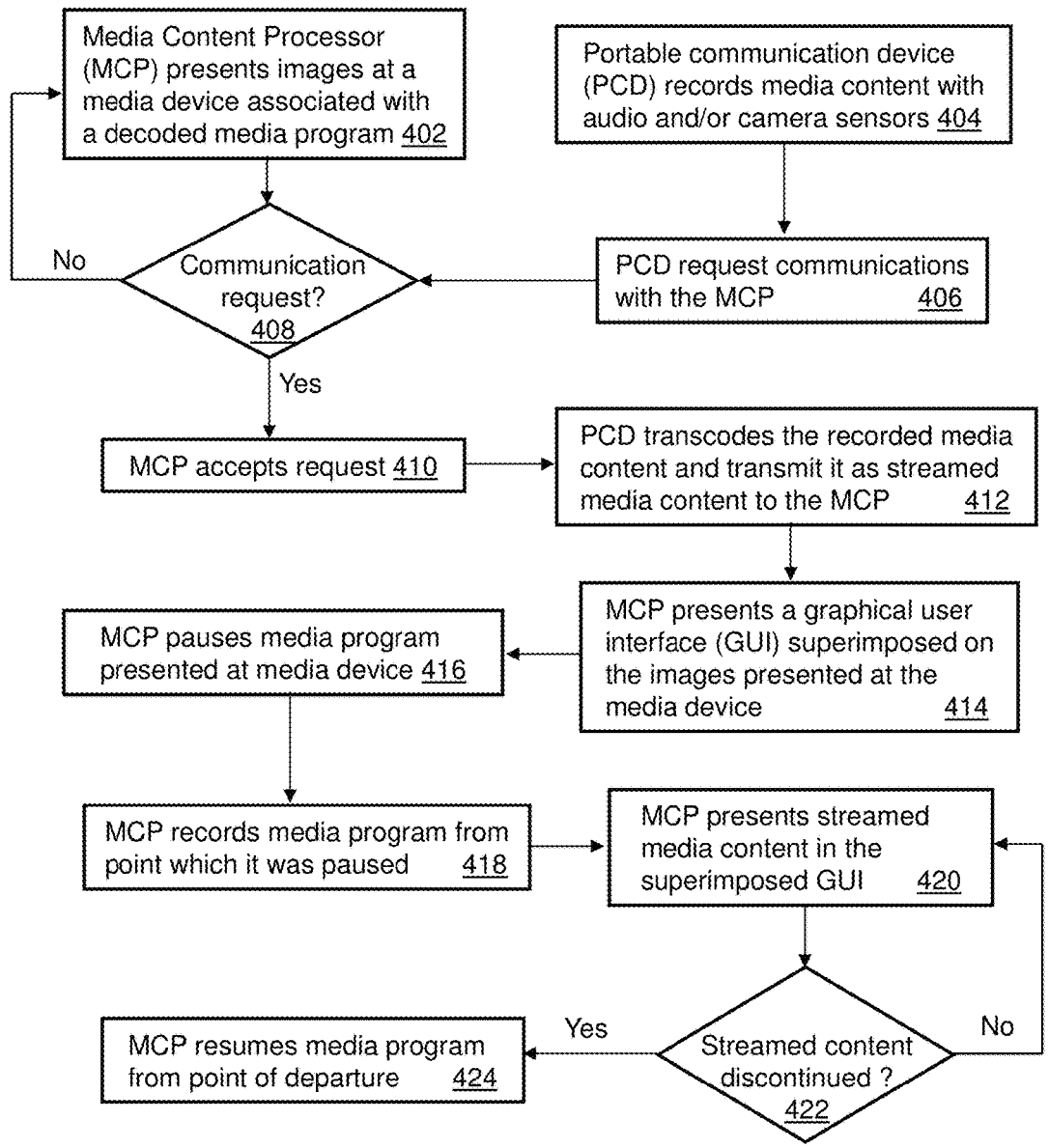
FIG. 4 depicts an exemplary method operating in portions of the communication system.

FIG. 4 depicts an exemplary method 400 operating in portions of the communication system 100. Method 400 begins with step 402 in which a media content processor (MCP) 106 presents images at a media device such as reference 108. The images can be associated with a decoded media program supplied by an IPTV, satellite TV, or cable TV communication system. The media program can represent audio content, video content or combinations thereof. While the MCP 106 is presenting still or moving images at the media device, it can monitor in step 408 for incoming communication requests from a portable communication device (PCD) 116.

In step 404 a PCD 116 can record media content with the aforementioned audio system 312 and/or camera sensor 316. The recorded media content can be audio-only content (by way of a microphone portion of the audio system 312), video-only content (by way of the camera sensor 316), and/or video with audio content in which case both the audio system 312 and the camera 316 are utilized. In step 406 the PCD 116 can establish communications with the MCP 106 in several ways. For example the PCD 116 can establish communications with the MCP 106 by way of portal 230. Alternatively, the PCD 116 can establish direct communications with the MCP 106 over the ISP network 132 over a virtual private network (VPN) connection or some other suitable means.

Once the MCP 106 detects a communication request in step 408 it accepts it in step 410 once valid credentials have been supplied (e.g., login, password). The PCD 116 can then transcode the recorded media content and transmit it to the MCP 106 as streamed media content in step 412. This step can be the result of a user of the PCD 116 desiring to transmit the recorded media content to another party actively engaged with the MCP 106. For example, suppose the user of the PCD 116 is traveling abroad and desires to send a friend or family member video content captured with the PCD while touring popular sites. Said user can direct the PCD 116 by way of its UI 304 to establish communications with the MCP 106 over an IP connection of an ISP network nearest the user that can connect to ISP network 132 and eventually the MCP 106 by way of the portal 230 or a direct link to the MCP via the gateway 104. The user of the PCD 116 can then communicate with a subscriber of the MCP 106 over an instant messaging application and inform said party that s/he will be transmitting streamed content of the tourist sites recorded by said user to the MCP.

Figure 5:
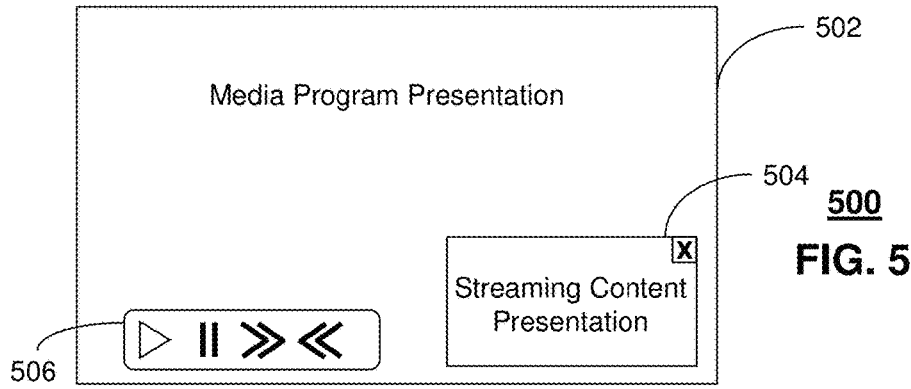
FIG. 5 depicts an exemplary embodiment of a graphical user interface resulting from an application of the method of FIG. 4.

The MCP 106 can respond to this transmission by presenting in step 414 a Graphical User Interface (GUI) superimposed on the images presented at the media device 108 (e.g., a picture-in-picture presentation). This step is illustrated in FIG. 5. Reference 502 can represent a canvas of the media device 108 for presenting media programs decoded from the communication system 100. GUI window 504 can be a pop-up window which is generated upon receiving streamed media content from the PCD 116.

Referring back to FIG. 4, in step 416 the MCP 106 can be programmed to pause the media program presented in the canvas 502 to allow the consumer to focus on the streamed media content presented in GUI window 504 without distraction. To avoid missing a portion of the presentation of the media program, the MCP 106 can be programmed to record the media program from a point at which it was paused while the streamed content is presented in step 420 in GUI window 504.

In step 422, the MCP 106 monitors for a discontinuation of the streamed media content. The discontinuation can be the result of the transmission of the streamed media content ending when the recorded media content has been fully played by the PCD 116. In another embodiment, a discontinuation can result from the recipient of the streamed media content closing the GUI window 504 by selecting the "X" with a common mouse pointer managed by the media controller 107. When events such as this are detected, the MCP 106 can proceed to step 424 and resume presentation of the media program at the point from which it was paused. It should be noted that the subscriber can also direct the MCP 106 to resume presentation of the media program by selecting with the media controller a play button presented as a toolbar 506 in the canvas 502. Accordingly, the subscriber of the MCP 106 can choose to view the media program while at the same time the MCP presents streamed content in GUI window 504.

Figure 6:
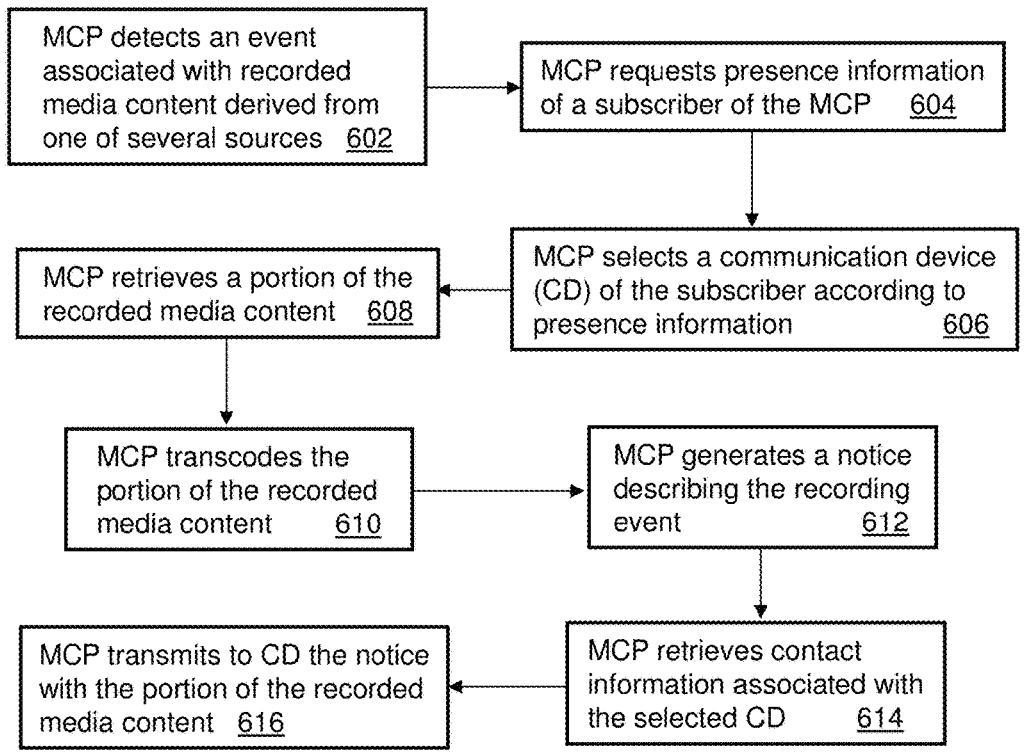
FIG. 6 depicts another exemplary method operating in portions of the communication system.

FIG. 6 depicts another exemplary method 600 operating in portions of the communication system 100. Method 600 begins with step 602 in which the MCP 106 detects a recording event associated with recorded media content derived from one among a plurality of media content sources. For example, one source of recorded media content can be a Video on Demand (VoD) catalog which the MCP 106 can access over the communication system 100 to download media content requested by a subscriber of the MCP. Another source can be a scheduled recording of a media program by a Digital Video Recorder (DVR) managed by the MCP 106 (as an internal functional unit, or external device).

In step 604 the MCP 106 can be programmed to request presence information of a subscriber of the MCP, and select in step 606 a communication device (CD) 108 or 116 according to said presence information. The presence information can for example identify a communication device actively in use by the subscriber of the MCP 106. For illustration purposes only, the CD 116 will be referred to in subsequent steps of method 600. Once a CD has been selected, the MCP 106 proceeds to step 608 where it retrieves a portion of the recorded media content detected in step 602 and transcodes it in step 610 so that it is adapted to a format that is suitable for presentation at the CD 116. The portion selected can be small but sufficient in duration to provide the subscriber a preview of the recorded media content.

In step 612, the MCP 106 can generate a notice describing the recording event. The notice can for example include a title of the recorded media content, its start time and/or duration. The notice can also include a description of the recorded media content such as a story line or synopsis, its genre, an identification of one or more contributors (e.g., actors, artists, directors, producers, etc.), and/or pricing information in cases where the media content is downloaded from a commercial source such as a VoD catalog. Once the notice has been generated, the MCP 106 can retrieve in step 614 contact information associated with the selected CD 116 from an address book managed by the MCP. With the contact information, the MCP 106 can transmit in step 616 the notice with the portion of the recorded media content. The notice and portion of media content can be transmitted as a message conforming to a multimedia messaging service protocol (also commonly referred to an MMS message).

Said notice and portion of recorded media content can serve to inform the subscriber of a select recording event. A message in the notice can say for example, "An episode of '24' has just been recorded by your DVR. Its duration is 50 minutes. You can preview the recording by selecting the attached media file." Another message might say, "The movie 'Matrix' has been downloaded from the VoD catalog. You can preview a portion of the movie by selecting the attached media file." Other more detailed messages can be presented with information about the actors, directors, producers, related programs, and so on. Additionally, these principles can be applied to audio-only content.

Upon reviewing the aforementioned embodiments, it would be evident to an artisan with ordinary skill in the art that said embodiments can be modified, reduced, or enhanced without departing from the scope and spirit of the claims described below. For example, method 400 can be adapted so that the MCP 106 is directed to record the streamed media content received from the PCD 116. Said recording can be used by the subscriber for subsequent viewings and/or for storing in the subscriber's personal archive. The MCP 106 can also be adapted to present the media program without a pause while simultaneously receiving the streamed content from the PCD 116. Method 600 can be similarly adapted so that the notice and the recorded portion of the media content can be transmitted in other mediums such as a Rich Site Summary (RSS) feed.

These are but a few examples of modifications that can be applied to the present disclosure without departing from the scope of the claims. Accordingly, the reader is directed to the claims section for a fuller understanding of the breadth and scope of the present disclosure.

Figure 7:
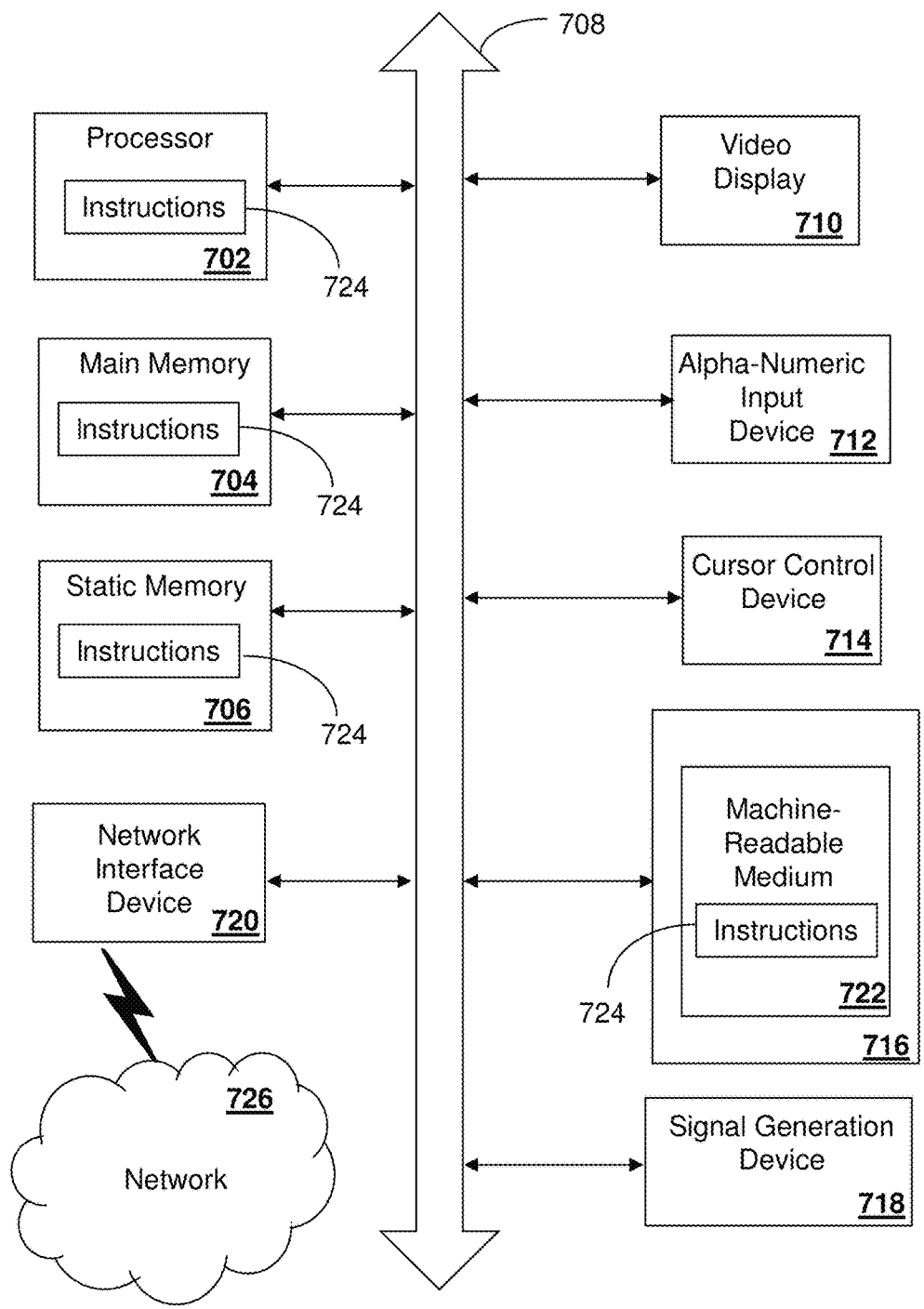
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processing system comprising a processor; and
   a memory that stores executable instructions that, when executed by the processing system, facilitate performance of operations, comprising:
      receiving media content from a first portable communication device;

recording the media content on a digital video recorder (DVR) resulting in recorded media content;

identifying a second portable communication device according to presence information received from a wireless network for a plurality of communication devices that comprises receiving location coordinates from the second portable communication device using a global positioning system (GPS), wherein the second portable communication device is one of the plurality of communication devices and is associated with a subscriber to the wireless network;

transmitting the recorded media content from the DVR to a media presentation device;

obtaining information regarding the media content, the information comprising a first preview portion comprising a portion of the media content received from the first portable communication device and a second preview portion comprising information obtained via the wireless network, the first preview portion having a duration less than that of the media content;

generating a notice to inform the subscriber that the recording on the DVR has been performed, wherein the DVR is accessible to the subscriber, and wherein the notice provides the subscriber an option to access the first preview portion or the second preview portion; and delivering the information regarding the media content and the notice through an instant messaging application to the second portable communication device.

2. The device of claim 1, wherein the operations further comprise transcoding the recorded media content according to characteristics of the second portable communication device.

3. The device of claim 1, wherein the notice comprises information regarding the recorded media content.

4. The device of claim 3, wherein the operations further comprise:

retrieving, from an address book, contact information associated with the second portable communication device, wherein the contact information conforms to a multimedia messaging service protocol; and transmitting, via the wireless network and according to the multimedia messaging service protocol, the notice to the second portable communication device.

5. The device of claim 3, wherein the operations further comprise receiving instructions from a portal to stream the recorded media content to the second portable communication device wherein the transmitting of the recorded media content from the DVR to the second portable communication device further comprises streaming the recorded media content to the second portable communication device.

6. The device of claim 3, wherein the notice comprises one of a title of the recorded media content, a start time of the recorded media content, a duration of the recorded media content, a description of the recorded media content, a genre of the recorded media content, an identification of a contributor of the recorded media content, pricing information, and combinations thereof.

7. The device of claim 1, wherein the device is located within a premises and the second portable communication device is located remote to the premises.

8. The device of claim 1, wherein the presence information indicates that the second portable communication device has been handed over from a first base station to a second base station.

9. A non-transitory machine-readable storage medium, comprising executable instructions that, when executed by a processing system including a processor, facilitate performance of operations, comprising:

recording media content on a digital video recorder (DVR) responsive to receiving the media content from a first portable communication device resulting in recorded media content;

requesting presence information for a subscriber to a media content provider;

identifying a second portable communication device according to presence information obtained from a wireless network for a plurality of communication devices associated with the subscriber that comprises receiving location coordinates from the second portable communication device using a global positioning system (GPS), wherein the second portable communication device is one of the plurality of communication devices;

streaming the recorded media content from the DVR to a media presentation device;

obtaining information regarding the media content, the information comprising a first preview portion comprising a portion of the media content received from the first portable communication device and a second preview portion comprising information obtained via the wireless network, the first preview portion having a duration less than that of the media content;

generating a notice to inform the subscriber that the recording on the DVR has been performed, wherein the DVR is accessible to the subscriber, and wherein the notice provides the subscriber an option to access the first preview portion or the second preview portion; and delivering the information regarding the media content and the notice through an instant messaging application to the second portable communication device.

10. The non-transitory machine-readable storage medium of claim 9, wherein the operations further comprise transcoding the recorded media content according to characteristics of the second portable communication device.

11. The non-transitory machine-readable storage medium of claim 9, wherein the notice comprises information regarding the recorded media content.

12. The non-transitory machine-readable storage medium of claim 11, wherein the operations further comprise:

retrieving contact information associated with the second portable communication device, wherein the contact information conforms to a multimedia messaging service protocol; and transmitting, via the wireless network and according to the multimedia messaging service protocol, the notice to the second portable communication device.

13. The non-transitory machine-readable storage medium of claim 11, receiving instructions from a portal to stream the recorded media content to the second portable communication device.

14. The non-transitory machine-readable storage medium of claim 11, wherein the notice comprises one of a title of the recorded media content, a start time of the recorded media content, a duration of the recorded media content, a description of the recorded media content, a genre of the recorded media content, an identification of a contributor of the recorded media content, pricing information, and combinations thereof.

15. The non-transitory machine-readable storage medium of claim 9, wherein the first portable communication device is at a first location and the second portable communication device is at a second location remote to the first location.

16. A method, comprising:
obtaining, by processing system including a processor, media content from a first portable communication device;
recording, by the processing system, the media content on a digital video recorder (DVR) resulting in recorded media content;
selecting, by the processing system, a second portable communication device associated with a subscriber, wherein the second portable communication device is selected according to presence information associating the subscriber to the second portable communication device that comprises receiving location coordinates from the second portable communication device using a global positioning system (GPS), wherein the presence information indicates that the second portable communication device is in active communication with a wireless network;
retrieving, by the processing system, contact information associated with the second portable communication device, wherein the contact information conforms to a multimedia messaging service protocol;
generating, by the processing system, a notice to inform the subscriber that the recording on the DVR has been performed, wherein the DVR is associated with the subscriber;
transmitting, by the processing system via the wireless network, the notice to the second portable communication device according to the multimedia messaging service protocol;
streaming, by the processing system, the media content to a media presentation device;
obtaining, by the processing system, information regarding the media content, the information comprising a first preview portion comprising a portion of the media content received from the first portable communication device and a second preview portion comprising information obtained via the wireless network, the first preview portion having a duration less than that of the media content; and
delivering, by the processing system through an instant messaging application according to the multimedia messaging service protocol, the information regarding the media content and the notice to the second portable communication device, wherein the notice provides the subscriber an option to access the first preview portion or the second preview portion.

17. The method of claim 16, further comprising:
receiving, by the processing system, instructions from a portal to stream the recorded media content to the second portable communication device; and
streaming, by the processing system, the recorded media content to the second portable communication device.

18. The method of claim 16, further comprising transcoding, by the processing system, the recorded media content according to characteristics of the second portable communication device.

19. The method of claim 16, wherein the notice comprises one of a title of the recorded media content, a start time of the recorded media content, a duration of the recorded media content, a description of the recorded media content, a genre of the recorded media content, an identification of a contributor of the recorded media content, pricing information, and combinations thereof.

20. The method of claim 16, wherein the first portable communication device is at a first location and the second portable communication device is at a second location remote to the first location.

\* \* \* \* \*